United States Patent
Yoon et al.

(10) Patent No.: US 11,996,975 B2
(45) Date of Patent: May 28, 2024

(54) METHOD FOR NETWORK RESTORATION WHEN COMMUNICATION FAILURE OCCURS IN RAPIENET SYSTEM

(71) Applicant: LS ELECTRIC CO., LTD., Anyang-si (KR)

(72) Inventors: Geon Yoon, Anyang-si (KR); Sung-Han Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 390 days.

(21) Appl. No.: 17/442,667

(22) PCT Filed: Aug. 27, 2019

(86) PCT No.: PCT/KR2019/010877
§ 371 (c)(1),
(2) Date: Sep. 24, 2021

(87) PCT Pub. No.: WO2020/197008
PCT Pub. Date: Oct. 1, 2020

(65) Prior Publication Data
US 2022/0200842 A1    Jun. 23, 2022

(30) Foreign Application Priority Data

Mar. 25, 2019    (KR) .................. 10-2019-0033535

(51) Int. Cl.
*H04L 41/0654*    (2022.01)
*H04L 12/18*    (2006.01)
(Continued)

(52) U.S. Cl.
CPC .......... *H04L 41/0654* (2013.01); *H04L 12/18* (2013.01); *H04L 12/437* (2013.01); *H04L 41/0645* (2013.01)

(58) Field of Classification Search
CPC ... H04L 41/0654; H04L 12/18; H04L 12/437; H04L 41/0645; H04L 2012/4026;
(Continued)

(56) References Cited

U.S. PATENT DOCUMENTS 7,483,398 B1 * 1/2009 Huai .................. H04L 43/0811
370/242
7,596,313 B1 9/2009 Iyer et al.
(Continued)

FOREIGN PATENT DOCUMENTS

EP    2544058 A1    1/2013
JP    2011004435 A    1/2011
(Continued)

OTHER PUBLICATIONS

Takayanagi, et al.; "Latest Standard Trend of Real-Time Ethernet"; Instrumentation and Control vol. 49 No. 3; Mar. 2010; (12 pages).
(Continued)

*Primary Examiner* — Charles C Jiang
*Assistant Examiner* — Shawn D Miller
(74) *Attorney, Agent, or Firm* — K&L Gates LLP

(57) ABSTRACT

The present disclosure relates to a method for network recovery when a communication failure has occurred in a RAPIEnet system. According to the present disclosure, through periodic transmission of a message for inspecting whether a network communication failure has occurred between LNM devices or between RNMs in a ring- or line-shaped network in a RAPIEnet system, it is possible to accurately determine whether a network has a communication failure, and recover the network without imposing a burden on the network.

7 Claims, 7 Drawing Sheets

(51) Int. Cl.
*H04L 12/437* (2006.01)
*H04L 41/0631* (2022.01)

(58) Field of Classification Search
CPC ........... H04L 12/40182; H04L 41/0659; H04L 43/0805; H04L 43/10; H04L 41/064; H04L 43/0811
See application file for complete search history.

(56) References Cited

U.S. PATENT DOCUMENTS

| | | | |
|---|---|---|---|
| 2011/0026411 | A1 | 2/2011 | Hao |
| 2013/0010588 | A1 | 1/2013 | Kretschmann et al. |
| 2014/0226460 | A1 | 8/2014 | Kretschmann et al. |
| 2015/0092355 | A1 | 4/2015 | Kretschmann et al. |
| 2015/0207677 | A1* | 7/2015 | Choudhury ......... H04L 41/0895 370/254 |

FOREIGN PATENT DOCUMENTS

| | | |
|---|---|---|
| JP | 2011049958 A | 3/2011 |
| JP | 2012034370 A | 2/2012 |
| JP | 2015177550 A | 10/2015 |
| JP | 2017034463 A | 2/2017 |
| KR | 20180100935 A | 9/2018 |
| KR | 20200123588 A | 10/2020 |

OTHER PUBLICATIONS

Office Action for related Japanese Application No. 2021-556892; action dated Sep. 27, 2022; (3 pages).

Extended European Search Report for related European Application No. 19920769.7; action dated Apr. 4, 2022; (10 pages).

IEC; "Industrial communication networks—Fieldbus specifications—Part 4—X: Data-link layer protocol specification—Type x elements"; Jan. 25, 2019; pges 1-1502 pages; (only first 15 pages of document attached).

IEC; "Industrial communication networks—High availability automation networks—Part 7: Ring-based Redundancy Protocol (RRP)"; Dec. 16, 2011; (176 pages).

International Search Report for related International Application No. PCT/KR2019/010877; report dated Oct. 1, 2020; (5 pages).

Written Opinion for related International Application No. PCT/KR2019/010877; report dated Oct. 1, 2020; (4 pages).

* cited by examiner

METHOD FOR NETWORK RESTORATION WHEN COMMUNICATION FAILURE OCCURS IN RAPIENET SYSTEM

CROSS-REFERENCE TO RELATED APPLICATIONS

This application is the National Stage filing under 35 U.S.C. 371 of International Application No. PCT/KR2019/010877, filed on Aug. 27, 2019, which claims the benefit of earlier filing date and right of priority to Korea utility model Application No. 10-2019-0033535 filed on Mar. 25, 2019, the contents of which are all hereby incorporated by reference herein in their entirety.

FIELD

The present disclosure relates to a RAPIEnet system. More particularly, the present disclosure relates to a network recovering method when communication failure has occurred in the RAPIEnet system, in which periodic transmission of a message to check whether network communication failure has occurred between line network manager (LNM) devices or ring network manager (RNM) devices on a ring or line-shaped network in the RAPIEnet system is performed to more accurately determine whether communication failure of the network has occurred and recover the network while not burdening the network.

BACKGROUND

RAPIEnet stands for Real-time Automation Protocols for Industrial Ethernet. Applications thereof include automation of manufacturing processes of semiconductors and automobiles, automation of power facilities, etc. RAPIEnet may be applied to an environment which is poor in terms of temperature/chemical/noise/vibration, etc. For this reason, failures such as loss of communication function due to deterioration of the network equipment or disconnection of network cables may occur at arbitrary times.

In preparation for the failures such as loss of communication function as described above, conventional RAPIEnet has a function to notify the failure to the network.

FIGS. 1 to 4 show a concept of an operation for recovering the network when communication failure has occurred on the network in the conventional RAPIEnet system.

FIG. 1 illustrates the network recovering operation when the cable is disconnected or removed in the RAPIEnet line network line network composed of 4 network devices.

Referring to FIG. 1, it may be identified that a cable 150 connected to and disposed between the devices in the RAPIEnet line network composed of 4 network devices 100, 110, 120, and 130 is disconnected or removed.

In this case, in the conventional RAPIEnet system, two adjacent devices 110 and 120 to the cable 150 may recognize the changed state of the link. Then, the two adjacent devices 110 and 120 may broadcast to the network that they have become ends (LMN) of the network, and thus inform the devices 100 and 130 existing on the network that the network have become a new line network state.

FIG. 2 illustrates network recovering operation when a device is powered off in the RAPIEnet line network composed of 4 network devices.

Referring to FIG. 2, it may be identified that one device 110 is powered off in the RAPIEnet line network composed of four network devices network devices 100, 110, 120, and 130.

In this case, in the conventional RAPIEnet system, two network devices 100 and 120 adjacent to the device 110 whose power is turned off recognize the changed state of the link. In addition, the two network devices 100 and 120 adjacent to the device 110 may broadcast to the network that they have become the ends (LMN) of the network, and thus inform the devices 130 existing on the network that the network have become a new line network state.

In this connection, in FIG. 2, the network device 100 changes its state to SA (Stand Alone) because there are no other devices respectively connected to left and right sides of the network device 100.

FIG. 3 illustrates network recovering operation when the cable is disconnected or removed in the RAPIEnet ring network composed of 4 network devices.

Referring to FIG. 3, it may be identified that a cable 250 connected to and disposed between devices in the RAPIEnet ring network composed of four network devices 200, 210, 220, and 230 is disconnected or removed.

In this case, in the conventional RAPIEnet system, two devices 200 and 230 adjacent to the cable 250 may recognize the changed state of the link. Then, the two devices 200 and 230 may broadcast to the network that they have become ends (LNM) of the network, and thus inform the devices 210 and 220 existing on the network that the network have become a new line network state.

FIG. 4 illustrates network recovering operation when a device is powered off in the RAPIEnet ring network composed of 4 network devices.

Referring to FIG. 4, it may be identified that one device 230 is powered off in the RAPIEnet line network composed of four network devices network devices 200, 210, 220, and 230.

In this case, in the conventional RAPIEnet system, two network devices 200 and 220 adjacent to the device 230 that are powered off recognize the changed state of the link. Then, the two network devices 200 and 220 may broadcast to the network that they have become ends (LNM) of the network, and thus inform the devices 210 existing on the network that the network have become a new line network state.

That is, as described in FIGS. 1 to 4 above, the conventional RAPIEnet system provides a function to automatically recover the state of the network when the state of the network has changed due to link disconnection or power failure of the device.

The conventional network recovering method in the RAPIEnet system as described above may recover the network when the cable is disconnected or removed or the device is powered off. However, the conventional network recovering method may not recover the network when the communication failure is caused by device failure rather than by the communication failure between the devices or the power off of the device.

SUMMARY

A purpose of the present disclosure is to provide a network recovering method when communication failure has occurred in the RAPIEnet system, in which periodic transmission of a message to check whether network communication failure has occurred between line network manager (LNM) devices or ring network manager (RNM) devices on a ring or line-shaped network in the RAPIEnet system is performed to more accurately determine whether communication failure of the network has occurred and recover the network while not burdening the network.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

A method for recovering a network when communication failure has occurred in a RAPIEnet line network composed of a plurality of network devices comprises transmitting, first and second LNM (line network manager) network devices respectively positioned at both opposing ends of the line network, a network integrity check message (NICM) to the second and first LNM network devices, respectively; when the first and/or second LNM network devices fail to receive the NICM transmitted from the second and/or first LNM network devices, respectively, instructing, by each of the first and second LNM network devices, each of all network devices on the line network route to perform communication check with a network device of a neighboring node thereto; in response to the instruction, transmitting, by each of all network devices on the line network route, a family request message to the network device of the neighboring node thereto to identify a connection state therebetween; and changing, by the network device failing to not receive a response message to the family request message, a state thereof to LNM or SA (stand alone).

Further, the method may further comprise transmitting, by the network device which has received the response message to the family request message, the family request message to the network device of the neighboring node thereto to identify a connection state therebetween.

Further, the instructing of performing the communication check may include waiting, by the first and second LNM network devices, for the reception of the NICM transmitted from the second and first LNM network devices, respectively, for a preset time duration; and when the first and/or second LNM network devices fail to receive the NICM transmitted from the second and/or first LNM network devices, respectively, for the present time duration, broadcasting, by each of the first and second LNM network devices, a neighbor check command message (NCCM) to each of all network devices on the line network route.

Further, the method may further comprise broadcasting, by the network device whose state has been changed to the LNM among the network devices, a line start message for notifying that a new line network starts to the LNM network devices of the line network.

Further, the NICM may be repeatedly created according to a preset period and by each of the first and second LNM network devices respectively positioned at both opposing ends of the line network, and then may be transmitted to each of the second and first LNM network devices.

Further, the network device may be equipped with a RAPIEnet protocol and may have two communication ports to be able to transmit data in both opposite directions of the line network.

Further, a method for recovering a network when communication failure has occurred in a RAPIEnet ring network composed of a plurality of network devices comprises transmitting, each of first and second RNM (ring network manager) network devices on the ring network, a network integrity check message (NICM) along bidirectional routes of the ring network; when the first and/or second RNM network devices fail to receive the NICM transmitted from the second and/or first RNM network devices, respectively, instructing, by each of the first and second RNM network devices, each of all network devices on the bidirectional routes of the ring network to perform communication check with a network device of a neighboring node thereto; in response to the instruction, transmitting, by each of all network devices on the line network route, a family request message to the network device of the neighboring node thereto to identify a connection state therebetween; and changing, by the network device failing to not receive a response message to the family request message, a state thereof to LNM.

Further, the method may further comprise transmitting, by the network device which has received the response message to the family request message, the family request message to the network device of the neighboring node thereto to identify a connection state therebetween.

Further, the instructing of performing the communication check may include waiting, by the first and second RNM network devices, for the reception of the NICM transmitted from the second and first RNM network devices, respectively, for a preset time duration; and when the first and/or second RNM network devices fail to receive the NICM transmitted from the second and/or first RNM network devices, respectively, for the present time duration, broadcasting, by each of the first and second RNM network devices, a neighbor check command message (NCCM) to each of all network devices on the bidirectional routes of the ring network.

Further, the method may further comprise broadcasting, by the network device whose state has been changed to the LNM, a line start message for notifying formation of a new line network to the RNM network devices.

Further, the NICM may be repeatedly created according to a preset period and by each of the first and second RNM network devices, and then may be transmitted to each of the second and first LNM network devices.

According to the present disclosure, the network recovering method periodically transmits the message to check whether network communication failure has occurred between line network manager (LNM) devices or ring network manager (RNM) devices on a ring or line-shaped network in the RAPIEnet system to more accurately determine whether communication failure of the network has occurred and recover the network while not burdening the network.

Further, according to the present disclosure, the network recovering method may effectively detect not only the link state change such as cable disconnection and removal but also the communication failure of the network device or the communication line failure to more accurately determine whether communication failure of the network has occurred and recover the network.

The above-described effects, and specific effects of the present disclosure as not mentioned above will be described based on specific details for carrying out the disclosure.

DETAILED DESCRIPTION

Figure 1:
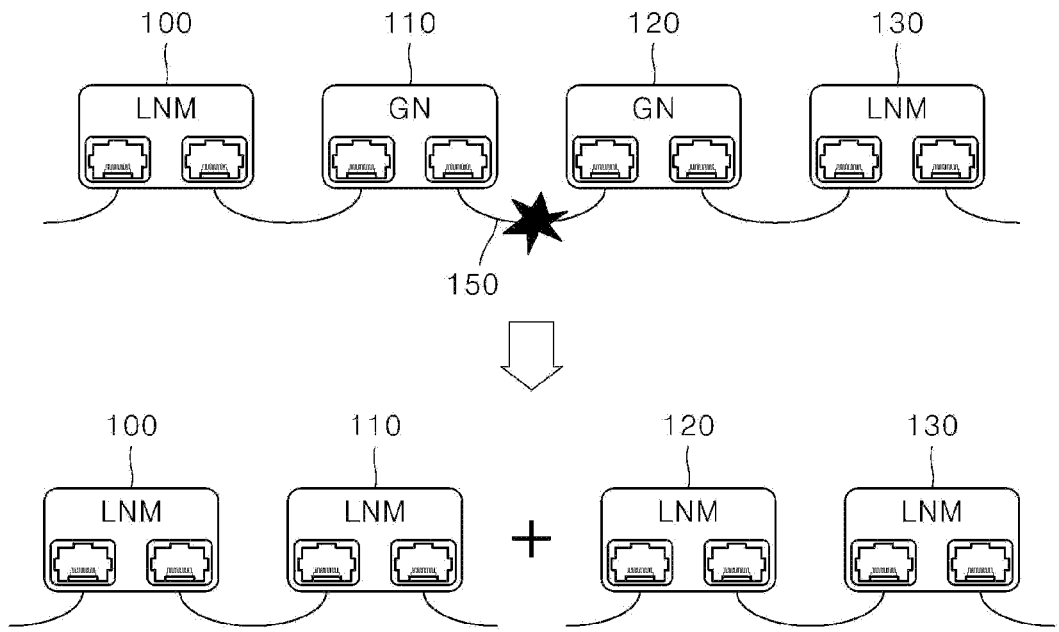
FIGS. 1 to 4 are conceptual diagrams of an operation for recovering the network when communication failure has occurred on the network in the conventional RAPIEnet system.
Figure 2:
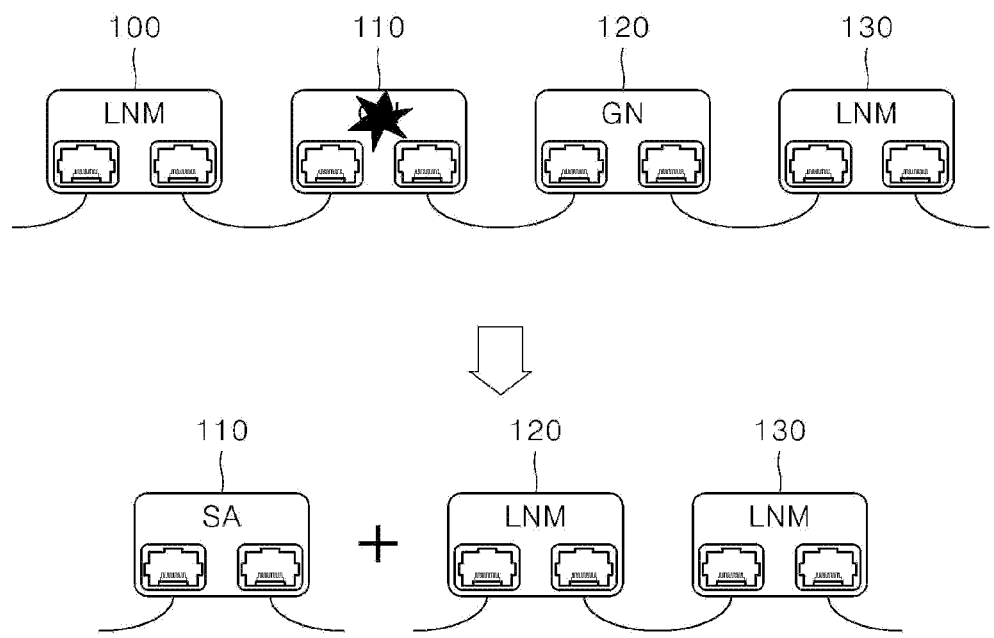
Figure 3:
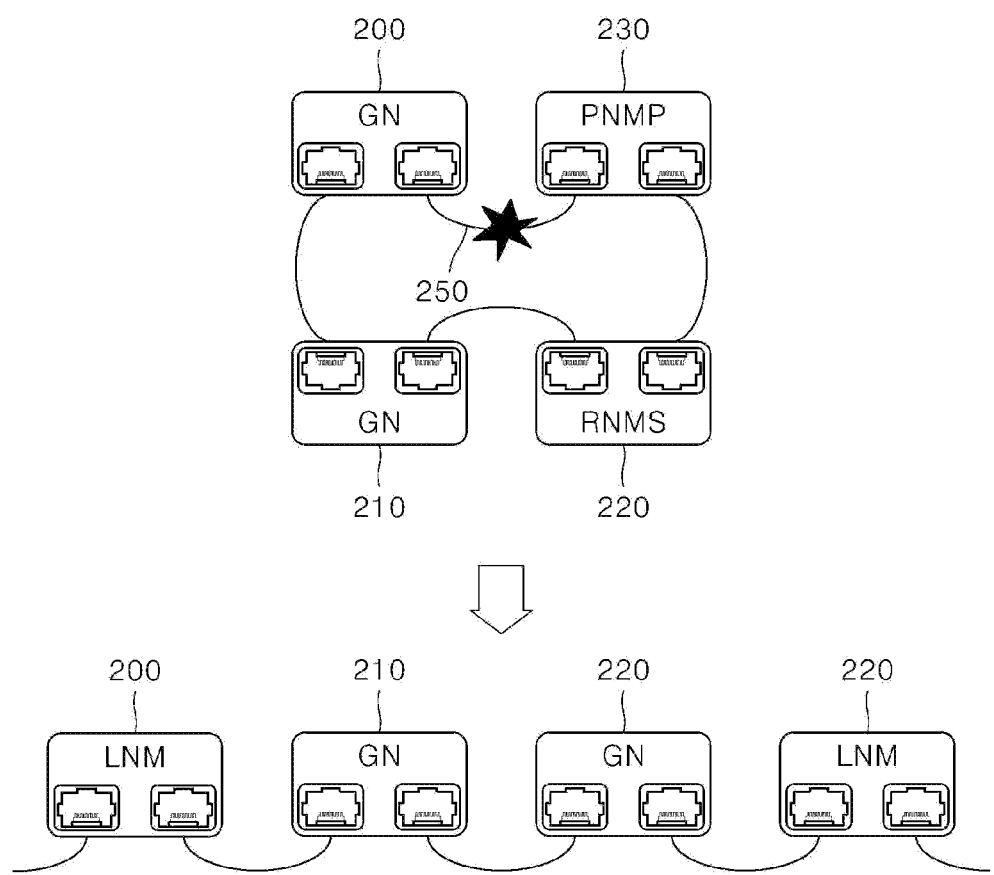
Figure 4:
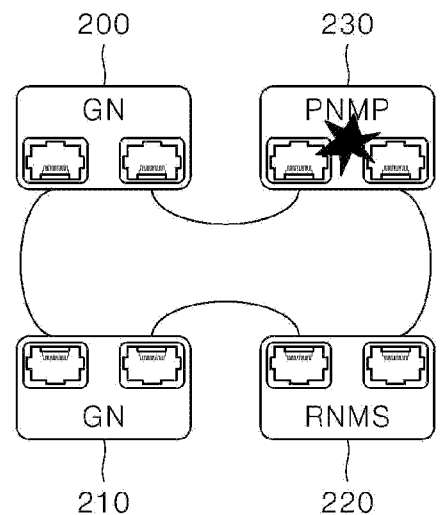
Figure 4:
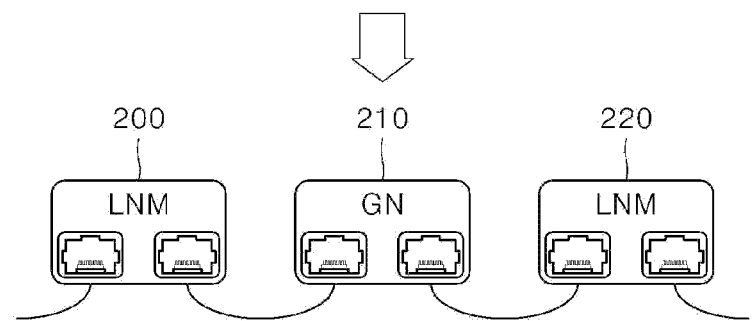

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

Figure 5:
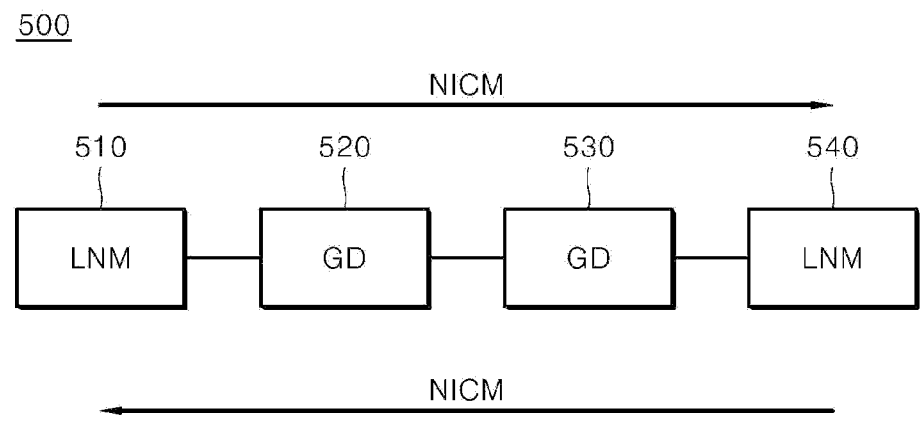
FIG. 5 is a conceptual diagram of an operation for recovering the network when communication failure has occurred on the line network in the RAPIEnet system according to one embodiment of the present disclosure.

FIG. 5 is a conceptual diagram of an operation for recovering the network when communication failure has occurred on the line network in the RAPIEnet system according to one embodiment of the present disclosure.

Further, FIG. 5 illustrates the network recovering operation when communication failure has occurred on the network in the RAPIEnet line network composed of four network devices 510, 520, 530, 540 according to one embodiment of the present disclosure. However, the present disclosure is not limited thereto.

Referring to FIG. 5, in the line network according to one embodiment of the present disclosure, two LNM network devices 510 and 540 respectively positioned at both ends of the line network may periodically transmit a network integrity check message (NICM) to the counterpart LNM network devices 540 and 510.

Next, the two LNM network devices 510 and 540 may periodically receive the NICM from the counterpart LNM network devices 540 and 510, and identify whether there is a problem such as communication failure in the network devices 510, 520, 530, and 540 existing on the network route.

Figure 6:
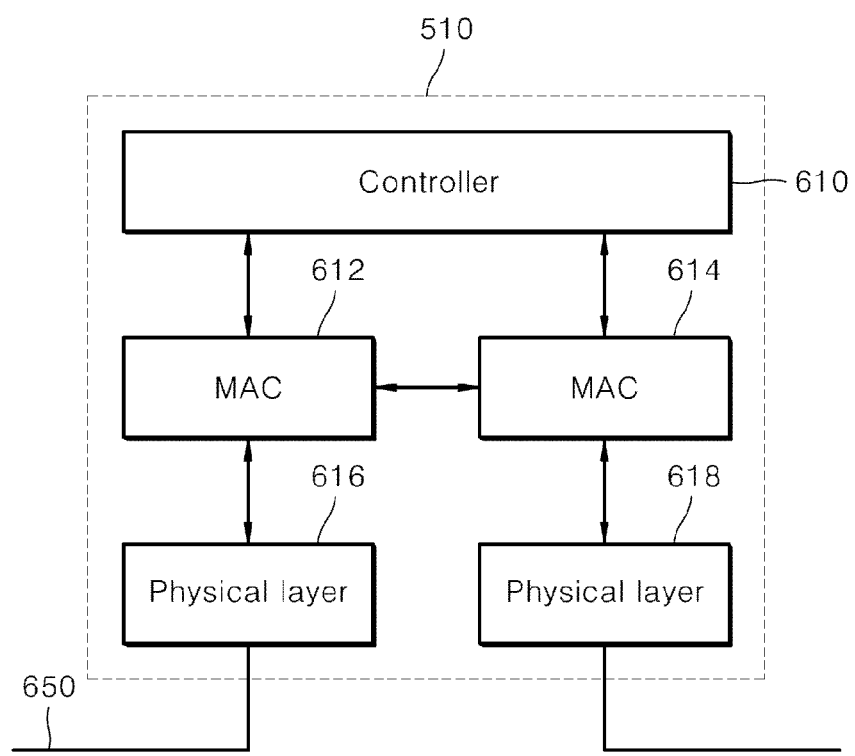
FIG. 6 is an internal configuration diagram of a network device shown in FIG. 5.

FIG. 6 shows the internal configuration of the network device shown in FIG. 5.

The network device 510 may be equipped with a protocol such as RAPIEnet. Further, the network device 510 may have two communication ports and may be capable of transmitting data in both directions of the network implemented as a line network or a ring network. The network device 510 may be an input/output device of a PLC (programmable logic controller).

Referring to FIG. 6, the network device 510 may include two physical layers 616 and 618 and media access controllers (MAC) 612 and 614, and a controller 610.

The physical layers 616 and 618 receive data from the network bus 650 and provide the data to the media access controllers 612 and 614. Further, the physical layers 616 and 618 transmit data applied from the media access controllers 612 and 614 to the network bus 650.

The media access controllers 612 and 614 receive data from the controller 610. The media access controllers 612 and 614 transmit the data received from the controller 610 to the network bus 650 via the physical layers 616 and 618.

Further, the media access controllers 612 and 614 determine a type of the data received via the physical layers 616 and 618. When it is determined that the data does not need to be transmitted to the controller 610, the media access controllers 612 and 614 may not transmit the data to the controller 610, but may transmit the data to the network bus 650 via the physical layers 616 and 618. Thus, the data may be transmitted to another network device on the network. In this connection, the data that does not need to be transmitted to the controller 610 may be NICM. The NICM may refer to a message transmitted to check whether there is a problem in the network route between LNM network devices 510 and 540 or between RNM network devices 810 and 840 of the line network or ring network according to one embodiment of the present disclosure. This NICM may not pass through the controller 610 but may be transmitted to a next network device in devices other than the LNM network device, and may not burden all of the network devices.

Further, the media access controllers 612 and 614 determine a type of data received via the physical layers 616 and 618. When the media access controllers 612 and 614 determine that the data needs to be transmitted to the controller 610, the media access controllers 612 and 614 transmit the data to the controller 610. In this connection, the data that needs to be transmitted to the controller 610 may be a neighbor check command message (NCCM) or a family request message. According to one embodiment of the present disclosure, the NCCM or family request message may be used to detect a network device in which communication failure has occurred when the communication failure has occurred due to disconnection or removal of the cable, the power off of the device, or the device failure in the line network or ring network. In all network devices, the NCCM or family request message may be set to be transmitted to the controller 610. The controller 610 may check whether communication failure has occurred in the network device of a neighbor node, based on a response message to the family request message.

The controller 610 performs data transmission/reception to and from the media access controllers 612 and 614. The controller 610 uses the transmitted and received data to determine whether communication failure has occurred on the network and whether the network device 510 having the controller 610 has become an end in the line network or the ring network.

In this connection, when the controller 610 determines that the network device 510 having the controller 610 has become the end in the line network or ring network upon the occurrence of the communication failure on the network, the controller 610 may change the state of the network device 510 to LNM or SA (Stand Alone). Then, the controller 610 transmits the changed state information to the LNM network device 540 or the RNM network device 840. Such state information may be converted into a line start message notifying that a new line network starts. The line start message may be broadcast to the network, and may be received by the LNM network device 540 or the RNM network device 840.

Figure 7:
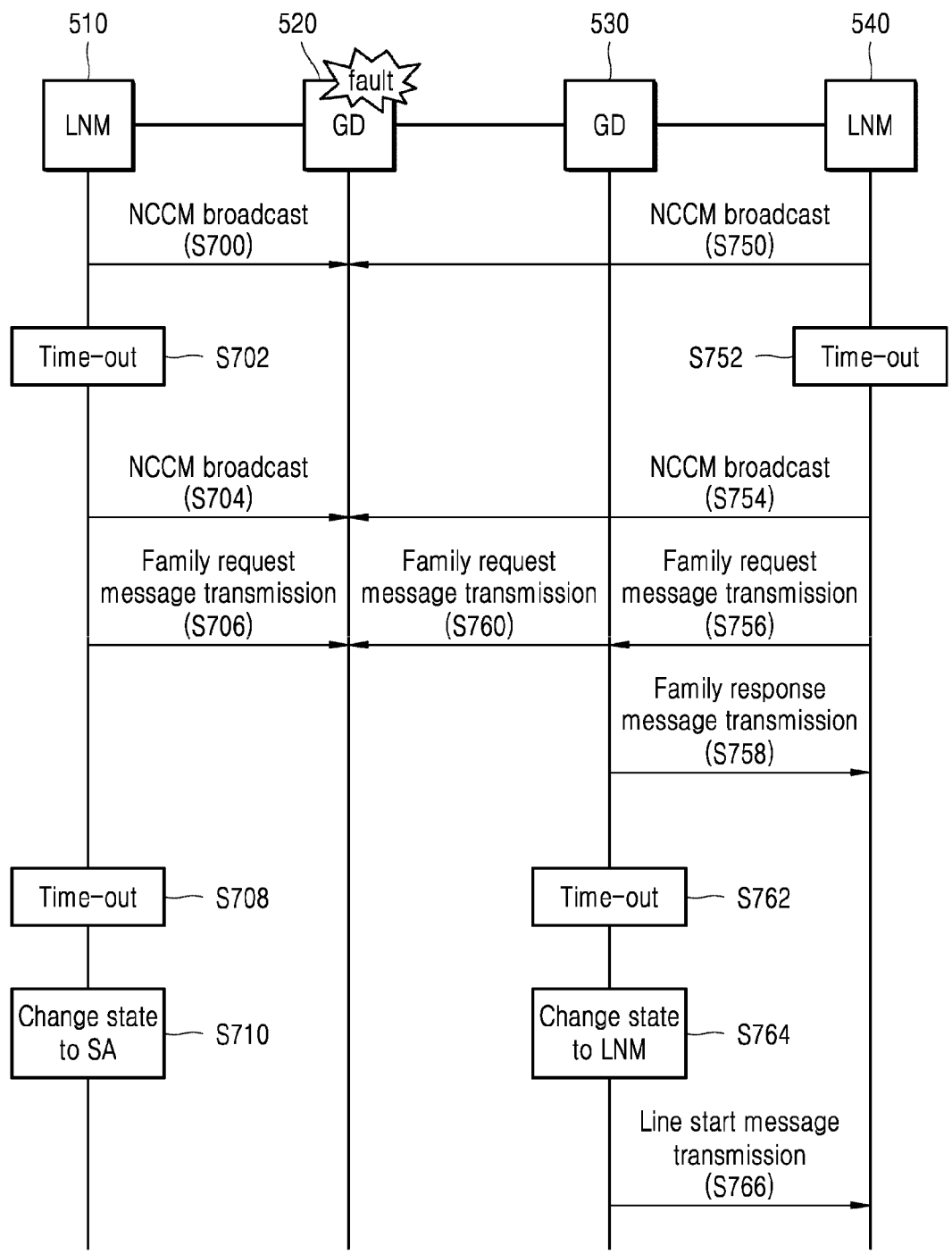
FIG. 7 is a signal processing flow diagram between network devices in a line network including a plurality of network devices according to one embodiment of the present disclosure.

FIG. 7 shows a signal processing flow between network devices for detecting a communication failure of a network device and recovering the network in a line network including a plurality of network devices of FIG. 5 according to one embodiment of the present disclosure.

Hereinafter, with reference to FIG. 7, one embodiment of the present disclosure will be described in more detail.

First, two LNM network devices 510 and 540 respectively positioned at both ends of the line network 500 transmit NICM to the counterpart LNM network devices 540 and 510 of the line network 500, respectively (S700 and S750).

In this connection, as shown in FIG. 7, communication failure has occurred in the network device 520 on the line network. Therefore, each of the LNM network devices 510 and 540 does not receive the NICM transmitted from each of the counterpart LNM network device 540 and 510, thus resulting in a time-out (S702, S752).

Then, each of the LNM network devices 510 and 540 may transmit NCCM to all network devices 520 and 530 on the line network in a broadcast manner to instruct each of all network devices 520 and 530 on the line network route to check communication with a network device of a neighboring node thereto (S704, S754).

Then, upon receiving the NCCM, each of the network devices 520 and 530 may transmit the family request message to a network device of a neighboring node thereto, and may check whether the network device of the neighboring node operates a normally.

In this connection, the communication failure has occurred in the network device 520 on the line network. Thus, the LNM network device 510 at a left end of FIG. 7 does not normally receive the family response message to the family request message (S706) and thus a timeout occurs (S708).

Then, the LNM network device 510 may determine that a problem has occurred in the route with the network device 520 of the neighbor node thereto, the LNM network device 510 changes its state to LNM or SA (S710). In this connection, the LNM network device 510 at the left end of FIG. 7 changes its state to SA because there are no network devices respectively connected to the left and right sides of the network device 510.

On the other hand, the LNM network device 540 at the right end of FIG. 7 normally receives the family response message to the family request message S756 because the network device 530 adjacent to the LNM network device 540 normally operates (S758).

Then, the network device 530 transmits a family request message to the network device 520 of a neighboring node thereto (S760). In this connection, because the communication failure has occurred in the network device 520, a timeout occurs in the network device 530 (S762).

Then, the network device 530 in which the timeout has occurred may determine that a problem has occurred in the route with the network device 520 of the neighbor node thereto, and thus may change a state thereof to LNM or SA.

In this connection, the network device 530 is connected to the LNM network device 540 and thus changes a state thereof to the LNM (S764). Next, the network device 530 whose state has changed to the LNM transmits a line start message to the LNM network device 540 to inform that a new line network starts (S766).

Figure 8:
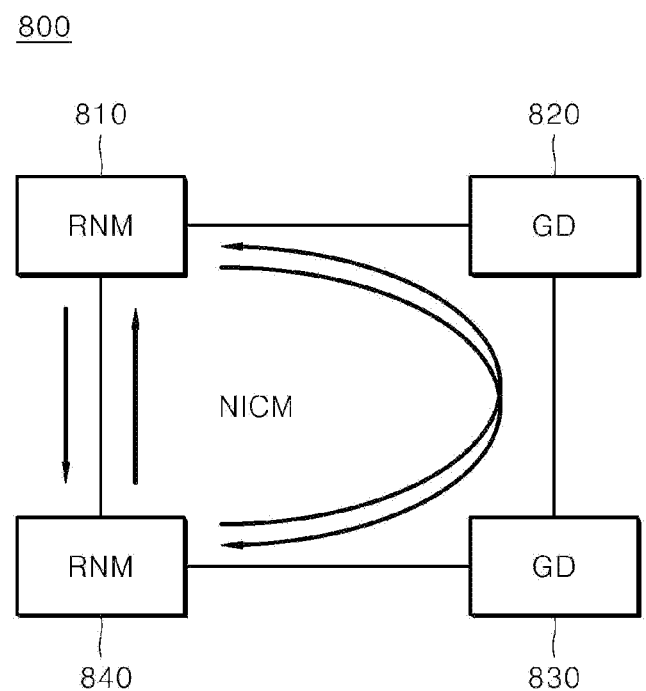
FIG. 8 is a conceptual diagram of an operation for recovering the network when communication failure has occurred on the ring network in the RAPIEnet system according to one embodiment of the present disclosure.

FIG. 8 shows a concept of an operation for recovering the network when communication failure has occurred on the ring network in the RAPIEnet system according to one embodiment of the present disclosure.

Further, FIG. 8 illustrates the network recovering operation when communication failure has occurred on the network in the RAPIEnet ring network composed of four network devices 810, 820, 830, and 840 according to one embodiment of the present disclosure. The present disclosure is not limited thereto.

Referring to FIG. 8, in the ring network according to one embodiment of the present disclosure, two RNM network devices 810 and 840 on the ring network periodically transmit NICM to the counterpart two RNM network devices 840 and 810 in a bidirectional route of the ring network, respectively.

Next, the two RNM network devices 810 and 840 may periodically receive NICM from the counter RNM network devices 840 and 810, and may identify whether there is a problem such as communication failure in each of the network devices 810, 820, 830, and 840 existing on the network route.

Figure 9:
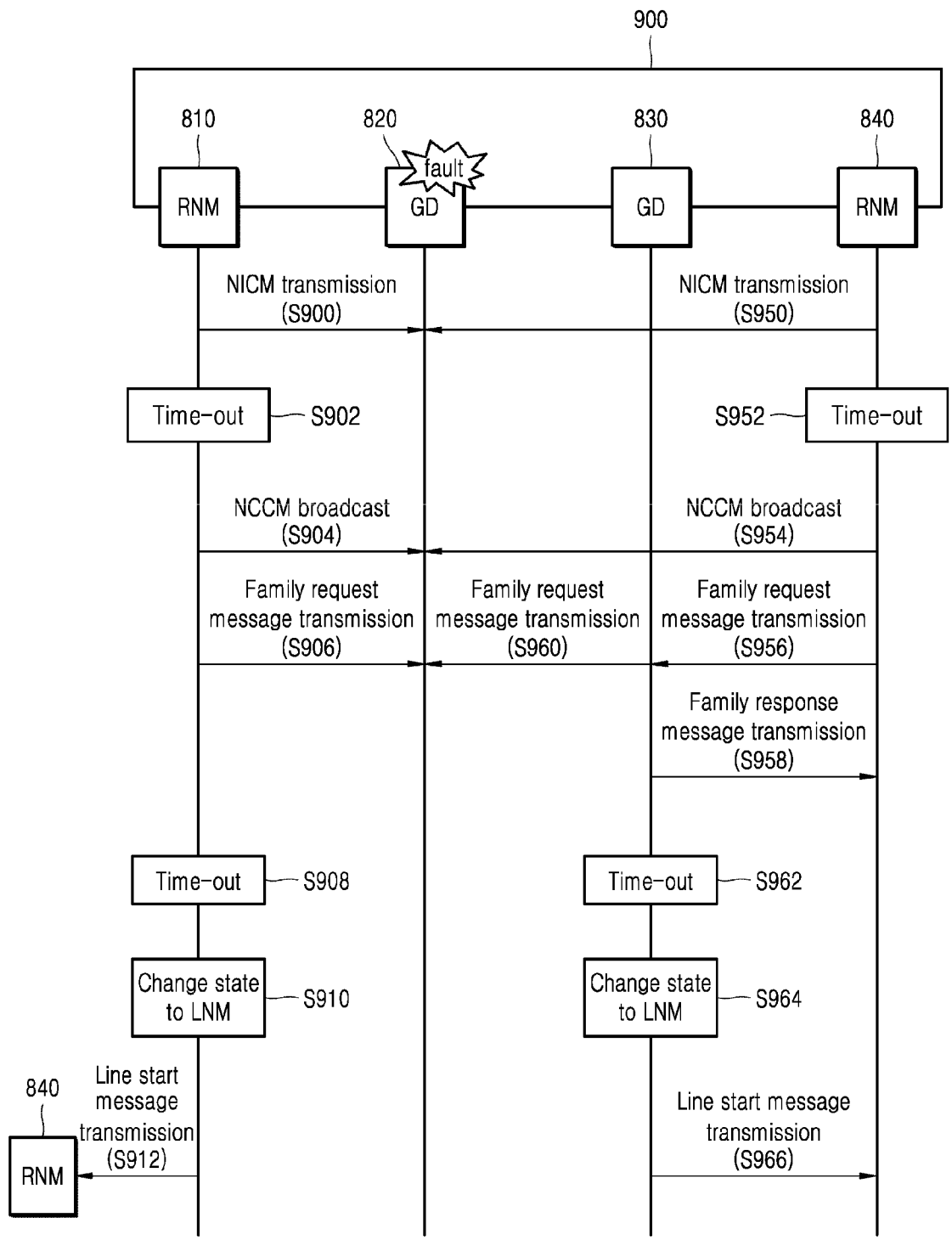
FIG. 9 is a flowchart of signal processing between network devices in a ring network including a plurality of network devices according to one embodiment of the present disclosure.

FIG. 9 shows a signal processing flow between network devices for detecting a communication failure of a network device and recovering the network in a ring network including the plurality of network devices of FIG. 8 according to one embodiment of the present disclosure.

Hereinafter, one embodiment of the present disclosure will be described in more detail with reference to FIG. 9.

First, each of two RNM network devices 810 and 840 respectively positioned at both bidirectional route ends of the ring network 800 transmits NICM along the bidirectional route of the ring network 800 (S900, S950).

In this connection, as shown in FIG. 9, communication failure has occurred in the network device 820 on the ring network. Therefore, each of the RNM network devices 810 and 840 cannot receive the NICM transmitted from each of the counterpart RNM network devices, and thus a time-out occurs (S902, S952).

Then, each of the RNM network devices 810 and 840 transmits NCCM, in a broadcast manner, to all network devices 820 and 830 on the ring network to instruct each of all network devices 820 and 830 on the bidirectional route of the ring network to check communication with the network device of a neighboring node thereto (S904, S954). In this connection, FIG. 9 does not show a network device on a network 900 in the ring network. This is only for convenience of description. The present disclosure is equally applicable to the network device in the network 900.

Then, Upon receiving the NCCM, each of the network devices 820 and 830 transmits a family request message to the network device of the neighboring node thereto to check whether the network device of the neighboring node normally operates.

In this connection, because communication failure has occurred in the network device 820 on the ring network, a left RNM network device 810 of FIG. 9 fails to receive the family response message to the family request message (S906) and thus a timeout occurs (S908).

Then, the RNM network device 810 may determine that there is a problem in the route with the network device 820 of the neighboring node thereto, and may change a state thereof to LNM (S910). In this connection, because the communication failure has occurred in the network device 820 and the state of the network has changed to the line network, the RNM network device 810 changes a state thereof to the LNM.

Next, the network device 810 whose state has changed to the LNM transmits a line start message to the RNM network device 840 via the network (reference number 900) of the ring network to inform that a new line network starts (S912).

On the other hand, the RNM network device 840 at the right side of FIG. 9 normally receives the family response message to the family request message (S956) because the network device 830 adjacent to the RNM network device 840 is operating normally (S958).

Then, the network device 830 transmits a family request message to the network device 820 of a neighboring node thereto (S960). In this connection, because the communication failure has occurred in the network device 820, a timeout occurs in the network device 830 (S962).

Then, the network device 830 in which the timeout has occurred may determine that a problem has occurred in the route with the network device 820 of the neighbor node thereto, and thus may change a state thereof LNM (S964).

In this connection, the network device 830 is connected to the RNM network device 840 and changes a state thereof to LNM. Next, the network device 830 whose state has changed to the LNM transmits a line start message to the LNM network device 840 to inform that a new line network starts (S966).

As described above, according to the present disclosure, the network recovering method periodically transmits the message to check whether network communication failure has occurred between line network manager (LNM) devices or ring network manager (RNM) devices on a ring or line-shaped network in the RAPIEnet system to more accurately determine whether communication failure of the network has occurred and recover the network while not burdening the network.

All methods and procedures disclosed herein may be implemented, at least in part, using one or more computer programs or components. These components may be provided as a series of computer instructions stored in any conventional computer-readable medium or machine-readable medium, including volatile and non-volatile memory such as RAM, ROM, flash memory, magnetic or optical disks, optical memory or other storage devices. The instructions may be provided as software or firmware, and may be implemented in whole or in part in a hardware component such as an ASIC, FPGA, DSP or other similar device. The instructions may be configured to be executed by one or more processors or other hardware components to perform or facilitate the performance of all or some of steps of the disclosed method and procedure.

As described above, the present disclosure has been described with reference to the illustrated drawings, but the present disclosure is not limited by the embodiments and drawings disclosed in the present specification. It is obvious that various modifications may be made by those skilled in the art within the scope of the technical idea of the present disclosure. In addition, when effects according to the configuration of the present disclosure are not explicitly described in describing the embodiments of the present disclosure, it is natural that predictable effects from the configuration should also be recognized.

What is claimed is:

1. A method for recovering a network when communication failure has occurred in a RAPIEnet line network composed of a plurality of network devices, the method comprising:
    transmitting, first and second LNM (line network manager) network devices respectively positioned at both opposing ends of the line network, a network integrity check message (NICM) to the second and first LNM network devices, respectively;
    when the first and/or second LNM network devices fail to receive the NICM transmitted from the second and/or first LNM network devices, respectively, instructing, by each of the first and second LNM network devices, each of all network devices on the line network route to perform communication check with a network device of a neighboring node thereto;
    in response to the instruction, transmitting, by each of all network devices on the line network route, a family request message to the network device of the neighboring node thereto to identify a connection state therebetween; and
    changing, by the network device failing to not receive a response message to the family request message, a state thereof to LNM or SA (stand alone),
    wherein the instructing of performing the communication check includes:
    waiting, by the first and second LNM network devices, for the reception of the NICM transmitted from the second and first LNM network devices, respectively, for a preset time duration; and
    when the first and/or second LNM network devices fail to receive the NICM transmitted from the second and/or first LNM network devices, respectively, for the present time duration, broadcasting, by each of the first and second LNM network devices, a neighbor check command message (NCCM) to each of all network devices on the line network route.

2. The method of claim 1, wherein the method further comprises broadcasting, by the network device whose state has been changed to the LNM among the network devices, a line start message for notifying that a new line network starts to the LNM network devices of the line network.

3. A method for recovering a network when communication failure has occurred in a RAPIEnet line network composed of a plurality of network devices, the method comprising:
    transmitting, first and second LNM (line network manager) network devices respectively positioned at both opposing ends of the line network, a network integrity check message (NICM) to the second and first LNM network devices, respectively;
    when the first and/or second LNM network devices fail to receive the NICM transmitted from the second and/or first LNM network devices, respectively, instructing, by each of the first and second LNM network devices, each of all network devices on the line network route to perform communication check with a network device of a neighboring node thereto;
    in response to the instruction, transmitting, by each of all network devices on the line network route, a family request message to the network device of the neighboring node thereto to identify a connection state therebetween; and
    changing, by the network device failing to not receive a response message to the family request message, a state thereof to LNM or SA (stand alone),
    wherein the NICM is repeatedly created according to a preset period and by each of the first and second LNM network devices respectively positioned at both opposing ends of the line network, and then is transmitted to each of the second and first LNM network devices.

4. A method for recovering a network when communication failure has occurred in a RAPIEnet line network composed of a plurality of network devices, the method comprising:
    transmitting, first and second LNM (line network manager) network devices respectively positioned at both opposing ends of the line network, a network integrity check message (NICM) to the second and first LNM network devices, respectively;

when the first and/or second LNM network devices fail to receive the NICM transmitted from the second and/or first LNM network devices, respectively, instructing, by each of the first and second LNM network devices, each of all network devices on the line network route to perform communication check with a network device of a neighboring node thereto;

in response to the instruction, transmitting, by each of all network devices on the line network route, a family request message to the network device of the neighboring node thereto to identify a connection state therebetween; and changing, by the network device failing to not receive a response message to the family request message, a state thereof to LNM or SA (stand alone), wherein the network device is equipped with a RAPIEnet protocol and has two communication ports to be able to transmit data in both opposite directions of the line network.

5. A method for recovering a network when communication failure has occurred in a RAPIEnet ring network composed of a plurality of network devices, the method comprising:

transmitting, each of first and second RNM (ring network manager) network devices on the ring network, a network integrity check message (NICM) along bidirectional routes of the ring network;

when the first and/or second RNM network devices fail to receive the NICM transmitted from the second and/or first RNM network devices, respectively, instructing, by each of the first and second RNM network devices, each of all network devices on the bidirectional routes of the ring network to perform communication check with a network device of a neighboring node thereto;

in response to the instruction, transmitting, by each of all network devices on the line network route, a family request message to the network device of the neighboring node thereto to identify a connection state therebetween; and changing, by the network device failing to not receive a response message to the family request message, a state thereof to LNM, wherein the instructing of performing the communication check includes:

waiting, by the first and second RNM network devices, for the reception of the NICM transmitted from the second and first RNM network devices, respectively, for a preset time duration; and when the first and/or second RNM network devices fail to receive the NICM transmitted from the second and/or first RNM network devices, respectively, for the present time duration, broadcasting, by each of the first and second RNM network devices, a neighbor check command message (NCCM) to each of all network devices on the bidirectional routes of the ring network.

6. The method of claim 5, wherein the method further comprises broadcasting, by the network device whose state has been changed to the LNM, a line start message for notifying formation of a new line network to the RNM network devices.

7. A method for recovering a network when communication failure has occurred in a RAPIEnet ring network composed of a plurality of network devices, the method comprising:

transmitting, each of first and second RNM (ring network manager) network devices on the ring network, a network integrity check message (NICM) along bidirectional routes of the ring network;

when the first and/or second RNM network devices fail to receive the NICM transmitted from the second and/or first RNM network devices, respectively, instructing, by each of the first and second RNM network devices, each of all network devices on the bidirectional routes of the ring network to perform communication check with a network device of a neighboring node thereto:

in response to the instruction, transmitting, by each of all network devices on the line network route, a family request message to the network device of the neighboring node thereto to identify a connection state therebetween, and changing, by the network device failing to not receive a response message to the family request message, a state thereof to LNM, wherein the NICM is repeatedly created according to a preset period and by each of the first and second RNM network devices, and then is transmitted to each of the second and first LNM network devices.

\* \* \* \* \*